United States Patent
Ohta et al.

(10) Patent No.: US 7,050,703 B2
(45) Date of Patent: May 23, 2006

(54) VIDEO RECORDING AND PLAYBACK APPARATUS AND METHOD

(75) Inventors: Masashi Ohta, Tokyo (JP); Katsunari Miyata, Tokyo (JP)

(73) Assignee: Sony Corporation, Tokyo (JP)

(*) Notice: Subject to any disclaimer, the term of this patent is extended or adjusted under 35 U.S.C. 154(b) by 1121 days.

(21) Appl. No.: 09/805,405

(22) Filed: Mar. 13, 2001

(65) Prior Publication Data
US 2001/0022889 A1   Sep. 20, 2001

(30) Foreign Application Priority Data
Mar. 15, 2000 (JP) ............................ P2000-072357

(51) Int. Cl.
*H04N 7/64* (2006.01)
(52) U.S. Cl. ...................... 386/113; 386/114
(58) Field of Classification Search .............. 386/46, 386/113, 114, 115, 124, 47, 50, 73, 76, 2, 386/21, 22, 40; H04N 7/64
See application file for complete search history.

(56) References Cited

U.S. PATENT DOCUMENTS

| 4,984,070 A | * | 1/1991 | Tanaka et al. ............... 348/621 |
| 2001/0012325 A1 | * | 8/2001 | Kobayashi et al. .... 375/240.26 |

* cited by examiner

*Primary Examiner*—Robert Chevalier
(74) *Attorney, Agent, or Firm*—Oblon, Spivak, McClelland, Maier & Neustadt, P.C.

(57) ABSTRACT

A video recording and playback apparatus and method by which accurate motion detection can be executed is disclosed. A noise reduction processing circuit performs noise reduction processing for video data inputted thereto from a switch and outputs resulting video data to a motion detection processing section and a video signal interpolation processing section. The motion detection processing section performs a motion detection process for the received video data and outputs a result of the motion detection to the video signal interpolation processing section. The video signal interpolation processing section performs an interpolation process for the video data inputted thereto from the noise reduction processing circuit based on the result of the motion detection received from the motion detection processing section and outputs resulting video data.

4 Claims, 13 Drawing Sheets

F I G. 12
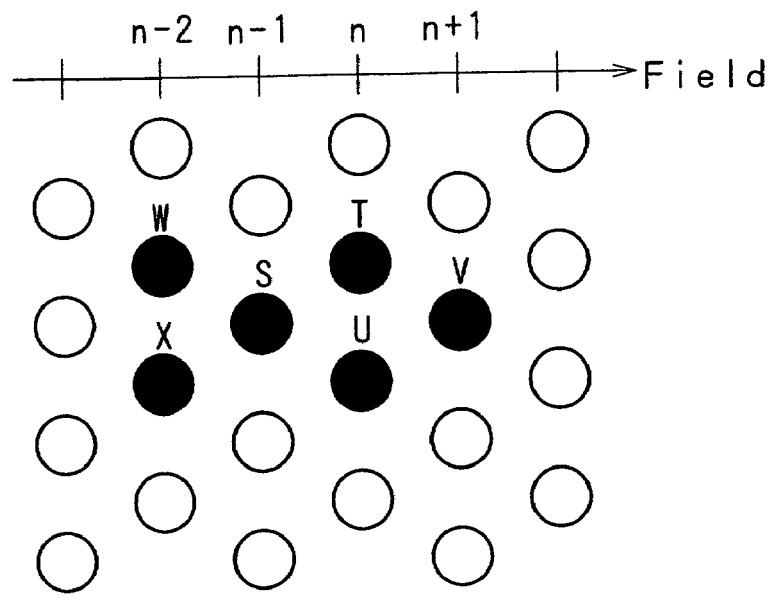
F I G. 13
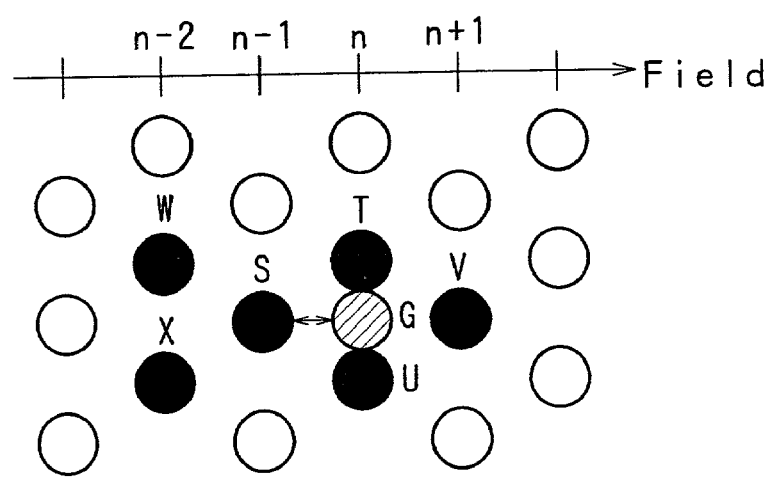

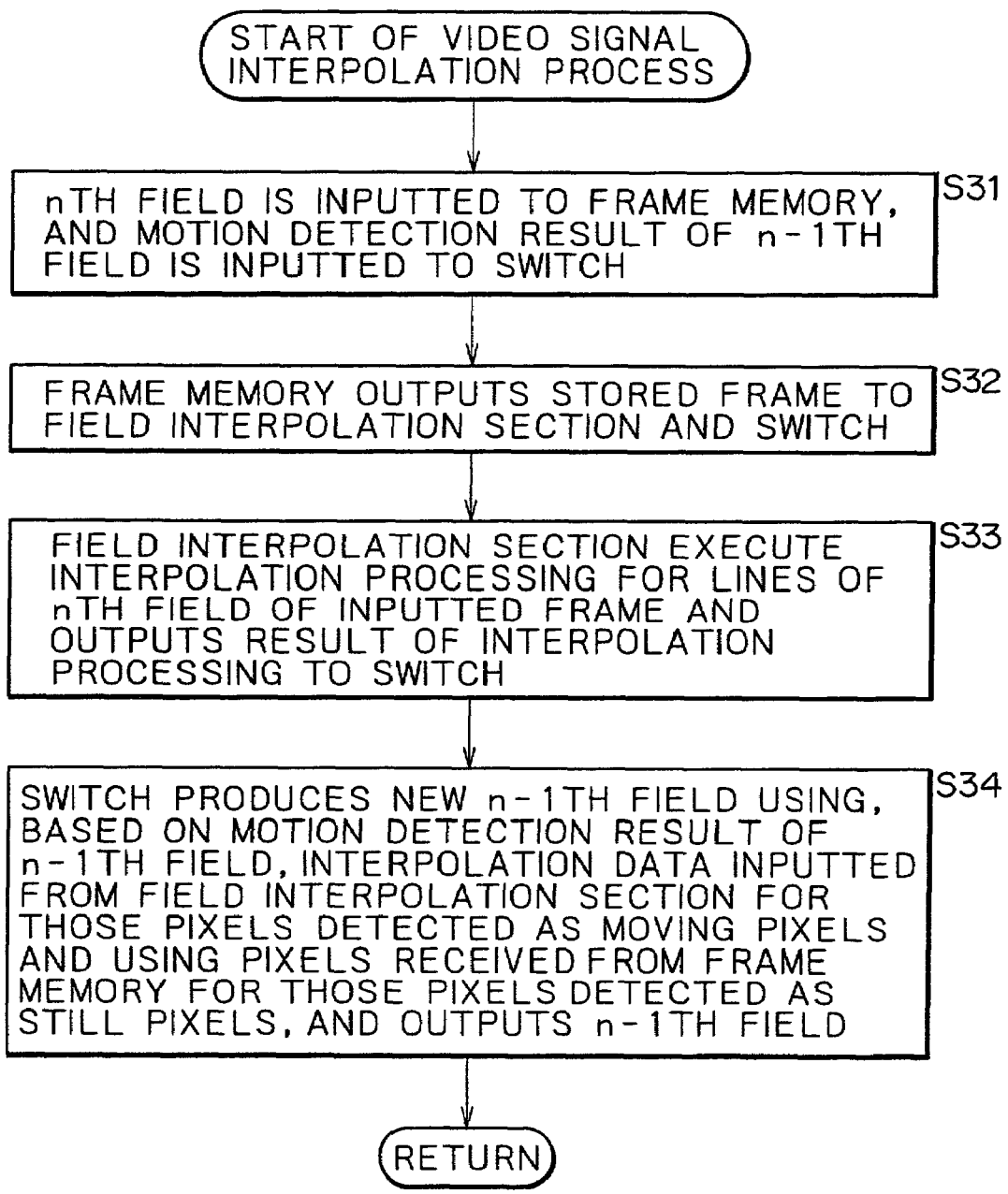

VIDEO RECORDING AND PLAYBACK APPARATUS AND METHOD

BACKGROUND OF THE INVENTION

This invention relates to a video recording and playback apparatus and method, and more particularly to a video recording and playback apparatus and method by which motion detection is performed.

A technique of displaying a video with an improved quality making use of an interpolation process of a video signal has been and is being popularized. The interpolation process of a video signal is performed based on a result of motion detection which is executed upon processing for production of a frame still picture free from blurring or upon format conversion of a video signal such as interlace to progressive conversion.

More particularly, for example, upon production of a frame still picture free from blurring, a difference between pixels at a corresponding position of different fields is calculated. Then, when the difference is equal to or greater than a predetermined threshold value, motion is detected, and the pixel is regarded as a moving pixel. On the contrary when the difference is smaller than the predetermined threshold value, motion is not detected, and the pixel is regarded as a still pixel. Further, for each pixel which is regarded as a moving pixel, an interpolation process is performed based on a pixel value of a preceding field, but any pixel which is regarded as a still pixel is outputted as it is. Through the process, a still picture of a high picture quality free from blurring is obtained.

The method described above, however, is disadvantageous in that, if a video signal inputted includes weak electric field noise, CCD (Charge Coupled Device) noise of a camera or noise generated through compression and decompression processes of the MPEG (Moving Picture Experts Group) system or the like, then the noise is detected as motion in error upon motion detection.

Also it has been proposed to perform a spatial filter process prior to motion detection so that such noise may not be detected as motion in error. However, the spatial filter process suppresses not only noise components but also motion components of the signal. Consequently, the proposed solution is disadvantageous in that motion which should originally be detected is not detected.

SUMMARY OF THE INVENTION

It is an object of the present invention to provide a video recording and playback apparatus and method by which accurate motion detection can be executed.

In order to attain the object described above, according to the present invention, motion detection is performed based on a video signal to be displayed for which noise reduction processing has been performed.

More particularly, according to an aspect of the present invention, there is provided a video recording and/or playback apparatus for recording a video supplied thereto or playing back a video recorded already, comprising noise reduction means for reducing noise of a video supplied to the video recording and/or playback apparatus or noise of a video recorded already by the video recording and/or playback apparatus, motion detection means for executing motion detection of the video whose noise has been reduced by the noise reduction means, and video signal interpolation processing means for performing an interpolation process for the video supplied or the video recorded already based on a result of the motion detection by the motion detection means, the noise reduction means being a cyclic noise reducer which uses either one or both of a field and a frame of the video.

According to another aspect of the present invention, there is provided a video recording and/or playback method for a video recording and/or playback apparatus for recording a video supplied thereto or playing back a video recorded already, comprising a noise reduction step of reducing noise of a video supplied to the video recording and/or playback apparatus or of a video recorded already by the video recording and/or playback apparatus using a cyclic noise reducer which uses either one or both of a field and a frame of the video, a motion detection step of executing motion detection of the video whose noise has been reduced by the processing in the noise reduction step, and a video signal interpolation processing step of performing an interpolation process for the video supplied or the video recorded already based on a result of the motion detection by the processing in the motion detection step.

With the video recording and playback apparatus and method, noise of a video supplied or of a video recorded already is reduced by means of a cyclic noise reducer which uses either one or both of a field and a frame of the video, and motion detection of the video from which noise has been reduced is performed. Then, an interpolation process is performed for the video supplied or the video recorded already based on a result of the motion detection. Consequently, the motion detection process can be performed accurately.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 12 is a diagrammatic view illustrating a positional relationship of pixels between different fields;

FIG. 13 is a diagrammatic view illustrating a field interpolation process;

FIG. 16 is a flow chart illustrating a video signal interpolation process.

DESCRIPTION OF THE PREFERRED EMBODIMENT

Figure 1:
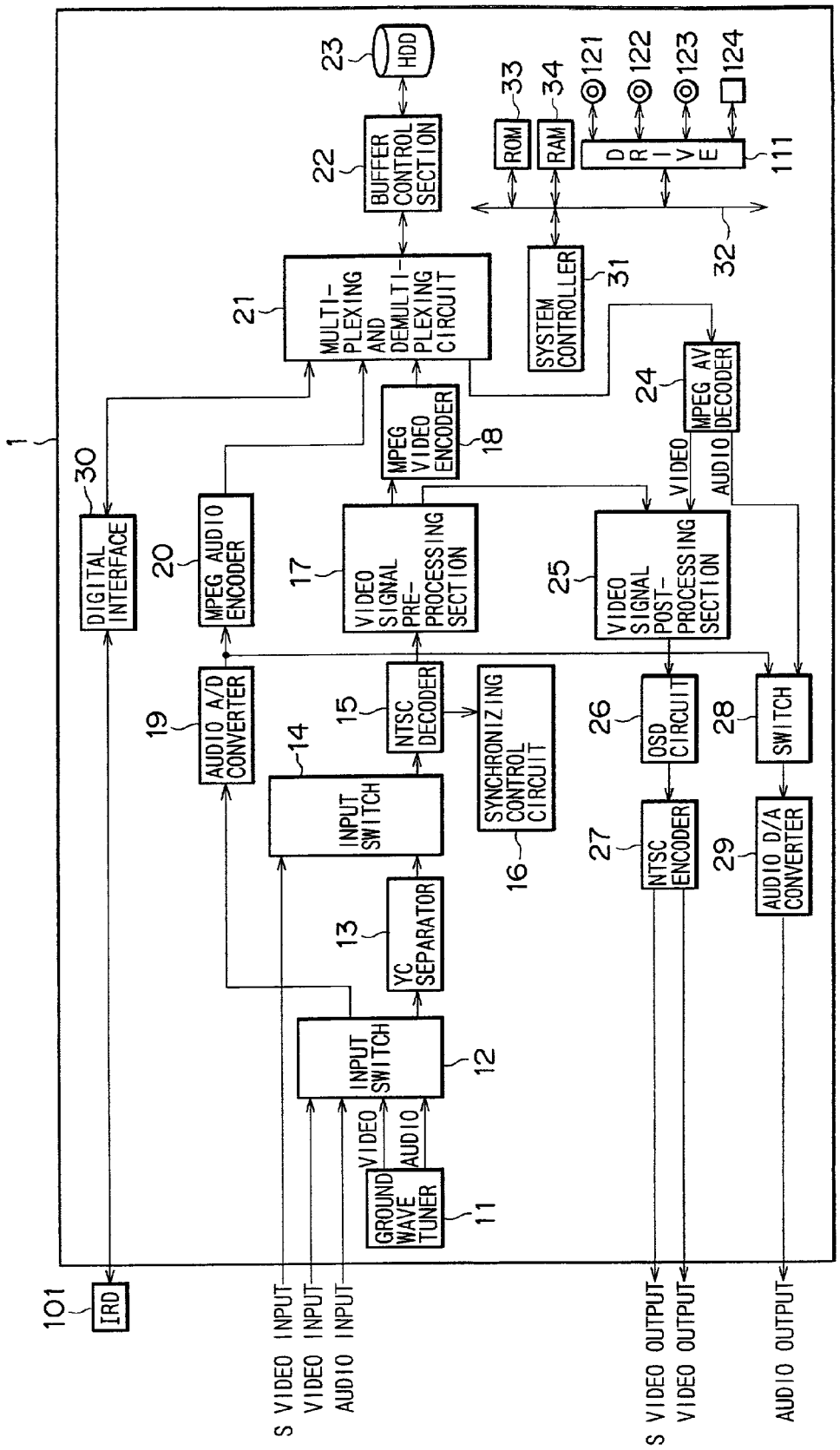
FIG. 1 is a block diagram showing a construction of a video signal recording and playback apparatus to which the present invention is applied.

Referring first to FIG. 1, there is shown a video recording and playback apparatus 1 to which the present invention is applied.

A ground wave tuner 11 of the video recording and playback apparatus 1 receives a ground wave from a broadcasting station not shown, and extracts a video signal and an audio signal from the ground wave and outputs the video signal and the audio signal to an input switch 12.

Not only the video signal and the audio signal from the ground wave tuner 11 but also composite video and audio signals from the outside are inputted to the input switch 12. The input switch 12 selects, in accordance with an instruction from a system controller 31, the video signal and the audio signal from the ground wave tuner 11 or the composite video and audio signals from the outside. The input switch 12 outputs the selected video signal to a YC (brightness signal and color signal) separator 13 and outputs the selected audio signal to an audio A/D (Analog/Digital) converter 19.

The YC separator 13 separates the video signal inputted thereto from the input switch 12 into a brightness signal and a color signal, and outputs the brightness signal and the color signal to another input switch 14. In addition to the video signal (brightness signal and color signal) inputted from the YC separator 13, an S video signal from the outside is inputted to the input switch 14. The input switch 14 switchably outputs, in accordance with an instruction from the system controller 31, the signal from the YC separator 13 or the S video signal to an NTSC (National Television System Committee) decoder 15.

The NTSC decoder 15 performs an A/D conversion process and a chroma decoding process for the video signal inputted thereto to convert the video signal into a digital video component signal (hereinafter referred to as video data), and outputs the video data to a video signal pre-processing section 17. Further, the NTSC decoder 15 supplies a horizontal synchronization signal, a vertical synchronization signal and a field discrimination signal of the inputted video signal to a synchronization control circuit 16. The synchronization control circuit 16 produces several different clock signals and synchronizing signals based on a synchronization control signal supplied thereto from the NTSC decoder 15, and suitably outputs them to necessary elements.

The video signal pre-processing section 17 performs a pre-filter process and so forth to video data inputted thereto, and outputs resulting video data to an MPEG (Moving Picture Experts Group) video encoder 18 and a video signal post-processing section 25. The MPEG video encoder 18 performs a block DCT (Discrete Cosine Transform) coding process (MPEG video encoding process) for pre-filter processed video data inputted from the video signal pre-processing section 17 to produce an ES (Elementary Stream) (video ES) of the video data, and outputs the video data elementary stream to a multiplexing and demultiplexing circuit 21. It is to be noted that, while, in the present example, the MPEG system is used as a compression system for video data, some other video compression system may be used instead or video data may not be compressed.

The audio A/D converter 19 converts an audio signal inputted thereto from the input switch 12 from an analog signal into a digital signal, and outputs the digital audio signal to an MPEG audio encoder 20 and a switch 28. The MPEG audio encoder 20 converts the digital audio signal inputted thereto from the audio A/D converter 19 into an audio signal of a format of the MPEG system, and produces an elementary stream (audio elementary stream) of audio data and outputs the audio elementary stream to the multiplexing and demultiplexing circuit 21. It is to be noted that the compression system for audio data may be some other system than the MPEG system, or audio data may not be compressed.

Upon recording, the multiplexing and demultiplexing circuit 21 performs a multiplexing process for the video elementary stream inputted thereto from the MPEG video encoder 18 and the audio elementary stream inputted thereto from the MPEG audio encoder 20, and produces and outputs a TS (Transport Stream) to a buffer control section 22. Upon playback, the multiplexing and demultiplexing circuit 21 extracts a PES (Packetized Elementary Stream) from a transport stream supplied thereto from the buffer control section 22, and outputs the packetized elementary stream to an MPEG AV (Audio/Visual) decoder 24.

Upon recording, the buffer control section 22 controls a buffer not shown to intermittently supply a transport stream inputted thereto from the multiplexing and demultiplexing circuit 21 to a HDD (Hard Disk Drive) 23. In particular, the buffer control section 22 cannot write a transport stream into the HDD 23, for example, while the HDD 23 is performing a seeking operation. Therefore, the buffer control section 22 temporarily stores the transport stream into the buffer, and performs such buffer control that, when writing of the HDD 23 is enabled, the transport stream is written into the HDD 23 at a rate higher than that when the transport stream is inputted from the multiplexing and demultiplexing circuit 21. Upon playback, the buffer control section 22 controls the buffer to output a signal intermittently inputted thereto from the HDD 23 as a continuous signal to the multiplexing and demultiplexing circuit 21.

The HDD 23 is controlled by the system controller 31, and records a transport stream supplied thereto from the buffer control section 22 into a predetermined address. It is to be noted that, while the HDD 23 uses an IDE (Integrated Drive Electronics) protocol as a protocol, some other protocol may be used instead. Further, while, in the video recording and playback apparatus 1, the HDD 23 is used as a recording medium which records video data, for example, an optical disk, a magneto-optical disk, a solid-state memory or a like element may be used instead.

The MPEG AV encoder 24 receives a video elementary stream and an audio elementary stream supplied thereto from the multiplexing and demultiplexing circuit 21. The MPEG AV encoder 24 performs a video MPEG decoding process for the video elementary stream to produce video data. Further, the MPEG AV encoder 24 performs an audio MPEG decoding process for the audio elementary stream to produce audio data. The MPEG AV encoder 24 outputs the produced video data to the video signal post-processing section 25 and outputs the audio data to the switch 28.

The video signal post-processing section 25 switchably selects the video data inputted thereto from the MPEG AV decoder 24 or the video data inputted thereto from the video signal pre-processing section 17 in accordance with an instruction from the system controller 31 to perform a motion detection process. Further, the video signal post-processing section 25 performs a video signal interpolation process for a result of the motion detection process, and outputs a resulting signal to an OSD (On Screen Display) circuit 26. It is to be noted that details of the video signal post-processing section 25 are hereinafter described.

The OSD circuit 26 produces graphics for screen display and so forth, and superposes the graphics and so forth on video data inputted thereto from the video signal post-processing section 25 or partially processes the graphics and so forth. Then, the OSD circuit 26 outputs resulting data to an NTSC encoder 27. The NTSC encoder 27 converts the video data inputted thereto from the OSD circuit 26 to a YC signal, and performs a D/A conversion process for the YC signal. Further, the NTSC encoder 27 produces and outputs an analog video signal, and produces and outputs an S video signal.

The switch 28 switchably select audio data supplied thereto from the MPEG AV decoder 24 or audio data supplied thereto from the audio A/D converter 19 in accordance with an instruction from the system controller 31, and outputs the selected audio data to an audio D/A (Digital/Analog) converter 29. The audio D/A converter 29 converts the audio signal inputted thereto from a digital signal into an analog signal, and outputs the analog signal as an audio output.

A digital interface 30 performs an interface process for a transport stream supplied from, for example, an IRD (Integrated Receiver Decoder) 101 as an external equipment through an IEEE (Institute of Electrical and Electronic Engineers) 1394 serial bus, and outputs the resulting transport stream to the multiplexing and demultiplexing circuit 21. Upon recording, the multiplexing and demultiplexing circuit 21 outputs the transport stream inputted thereto from the digital interface 30 to the buffer control section 22. On the other hand, upon playback, the multiplexing and demultiplexing circuit 21 outputs a transport stream supplied thereto from the buffer control section 22 to the digital interface 30. The digital interface 30 converts a signal inputted thereto from the multiplexing and demultiplexing circuit 21 into a signal of a format which complies with the IEEE 1394 serial bus, and outputs the resulting signal to the IRD 101. It is to be noted, while the IRD 101 is connected as an external apparatus to the video recording and playing back apparatus 1, a television receiver or some other AV (Audio/Visual) equipment may be used instead.

The system controller 31 controls operation of the entire video recording and playback apparatus 1. The system controller 31 reads in a basic program stored in a ROM (Read Only Memory) 33 suitably into a RAM (Random Access Memory) 34 through a host bus 32 and executes the basic program. Further, the system controller 31 reads in a program such as an OS (Operating system) stored in the HDD 23 and executes various processes. Furthermore, the system controller 31 reads in a program stored on a magnetic disk 121, an optical disk 122, a magneto-optical disk 123 or a semiconductor memory 124 loaded in a drive 111 suitably into the RAM 34 and executes the program.

Now, operation of the video recording and playback apparatus 1 when it records a video received by the ground wave tuner 11 is described.

The ground wave tuner 11 receives a radio wave from a broadcasting station not shown, extracts a video signal and an audio signal from the received radio wave and outputs the video signal and the audio signal to the input switch 12. The input switch 12 outputs the video signal inputted thereto from the ground wave tuner 11 to the YC separator 13 and outputs the audio signal inputted thereto from the ground wave tuner 11 to the audio A/D converter 19 in accordance with an instruction from the system controller 31.

The YC separator 13 separates the video signal inputted thereto from the input switch 12 into a brightness signal and a color signal and outputs the brightness signal and the color signal to the input switch 14. The input switch 14 outputs not an S video signal but the video signal inputted thereto from the YC separator 13 to the NTSC decoder 15 in accordance with an instruction of the system controller 31.

The NTSC decoder 15 performs A/D conversion and chroma decoding processing for the video signal of the NTSC system inputted thereto from the YC separator 13 to convert the video signal into video data and outputs the video data to the video signal pre-processing section 17.

The video signal pre-processing section 17 performs pre-filtering processing for the video data inputted thereto from the NTSC decoder 15 and outputs resulting video data to the MPEG video encoder 18. At this time, the video signal pre-processing section 17 outputs the video data also to the video signal post-processing section 25.

The MPEG video encoder 18 performs an MPEG video encoding process for the video data inputted thereto from the video signal pre-processing section 17 and produces a video elementary stream, and outputs the video elementary stream to the multiplexing and demultiplexing circuit 21.

Meanwhile, the audio A/D converter 19 converts the audio signal inputted thereto from the input switch 12 from an analog signal into a digital signal and outputs the digital audio signal to the MPEG audio encoder 20 and also to the switch 28.

The MPEG audio encoder 20 compresses the audio signal inputted thereto from the audio A/D converter 19 in accordance with the MPEG format to produce an audio elementary stream and outputs the audio elementary stream to the multiplexing and demultiplexing circuit 21.

The multiplexing and demultiplexing circuit 21 multiplexes the video elementary stream inputted thereto from the MPEG video encoder 18 and the audio elementary stream inputted thereto from the MPEG audio encoder 20 together with various control signals to produce a transport stream and outputs the transport stream to the buffer control section 22. The buffer control section 22 intermittently outputs the transport stream supplied thereto from the multiplexing and demultiplexing circuit 21 to the HDD 23. The HDD 23 intermittently records the transport stream into a predetermined address in accordance with a control signal from the system controller 31.

Subsequently, operation of the video recording and playback apparatus 1 when it plays back and outputs a transport stream recorded in the HDD 23 is described.

The HDD 23 reads out a transport stream recorded at a predetermined address thereof in accordance with a control signal from the system controller 31 and outputs the transport stream to the buffer control section 22. The buffer control section 22 controls the buffer so that a continuous transport stream may be formed from the transport stream inputted intermittently from the HDD 23, and outputs the continuous transport stream to the multiplexing and demultiplexing circuit 21.

The multiplexing and demultiplexing circuit 21 converts the transport stream inputted from the buffer control section 22 into a packetized elementary stream of a video elementary stream and an audio elementary stream and outputs the packetized elementary stream to the MPEG AV decoder 24. The MPEG AV decoder 24 outputs the video elementary stream inputted thereto to the video signal post-processing section 25 and outputs the audio elementary stream inputted thereto to the switch 28.

The video signal post-processing section 25 performs a motion detection process of the video elementary stream inputted thereto from the MPEG AV decoder 24 in accordance with an instruction from the system controller 31, performs an interpolation process for the video elementary stream based on a result of the motion detection and outputs a resulting video elementary stream to the OSD circuit 26. The OSD circuit 26 performs production of graphics and so forth, superposes the produced graphics and so forth on the video data supplied thereto from the video signal post-processing section 25 and outputs resulting video data to the NTSC encoder 27.

The NTSC encoder 27 converts the video data inputted thereto from the OSD circuit 26 into a YC signal, D/A converts the YC signal and outputs a resulting signal as a video signal.

Meanwhile, the switch 28 outputs the audio data inputted thereto from the MPEG AV decoder 24 to the audio D/A converter 29 in accordance with an instruction from the system controller 31. The audio D/A converter 29 converts the audio data inputted thereto from the MPEG AV decoder 24 from a digital signal into an analog signal and outputs the analog signal as an audio signal.

Figure 2:
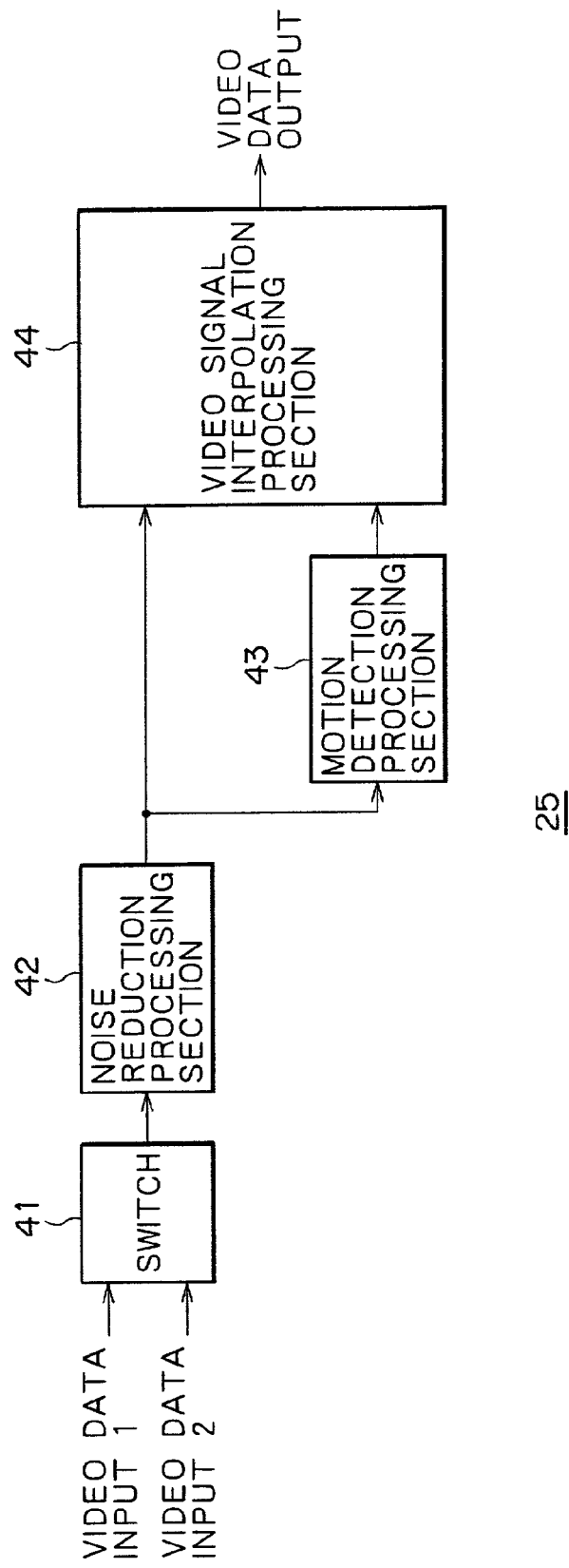
FIG. 2 is a block diagram showing a construction of a video signal post-processing section shown in FIG. 1.

Subsequently, details of the video signal post-processing section 25 are described with reference to FIG. 2. A switch 41 of the video signal post-processing section 25 receives a video data input (video data input 1) from the video signal pre-processing section 17 and another video data input (video data input 2) from the MPEG AV decoder 24 and switchably outputs one of the input signals to a noise reduction processing circuit 42.

The noise reduction processing circuit 42 reduces noise components of the video data inputted thereto from the switch 41 and outputs resulting video data to a motion detection processing section 43 and a video signal interpolation processing section 44. It is to be noted that details of the noise reduction processing circuit 42 are hereinafter described with reference to FIG. 4.

The motion detection processing section 43 performs a motion detection process for the video data inputted thereto from the noise reduction processing circuit 42 and outputs a result of the motion detection to the video signal interpolation processing section 44. It is to be noted that details of the motion detection processing section 43 are hereinafter described with reference to FIG. 5.

The video signal interpolation processing section 44 performs an interpolation process of the video data inputted thereto from the noise reduction processing circuit 42 based on the result of the motion detection inputted from the motion detection processing section 43, and outputs resulting video data to the OSD circuit 26. It is to be noted that the video signal interpolation processing section 44 is hereinafter described with reference to FIG. 7.

Since the noise reduction processing circuit 42 is arranged in the preceding stage to the motion detection processing section 43 in such a manner as described above, a motion detection process of an inputted signal is executed by the motion detection processing section 43 after noise reduction processing is performed for the inputted signal. This suppresses such erroneous detection that noise is detected as motion, and therefore, the video signal interpolation processing section 44 can perform an interpolation process of the video data based on the correct result of the motion detection.

Figure 3:
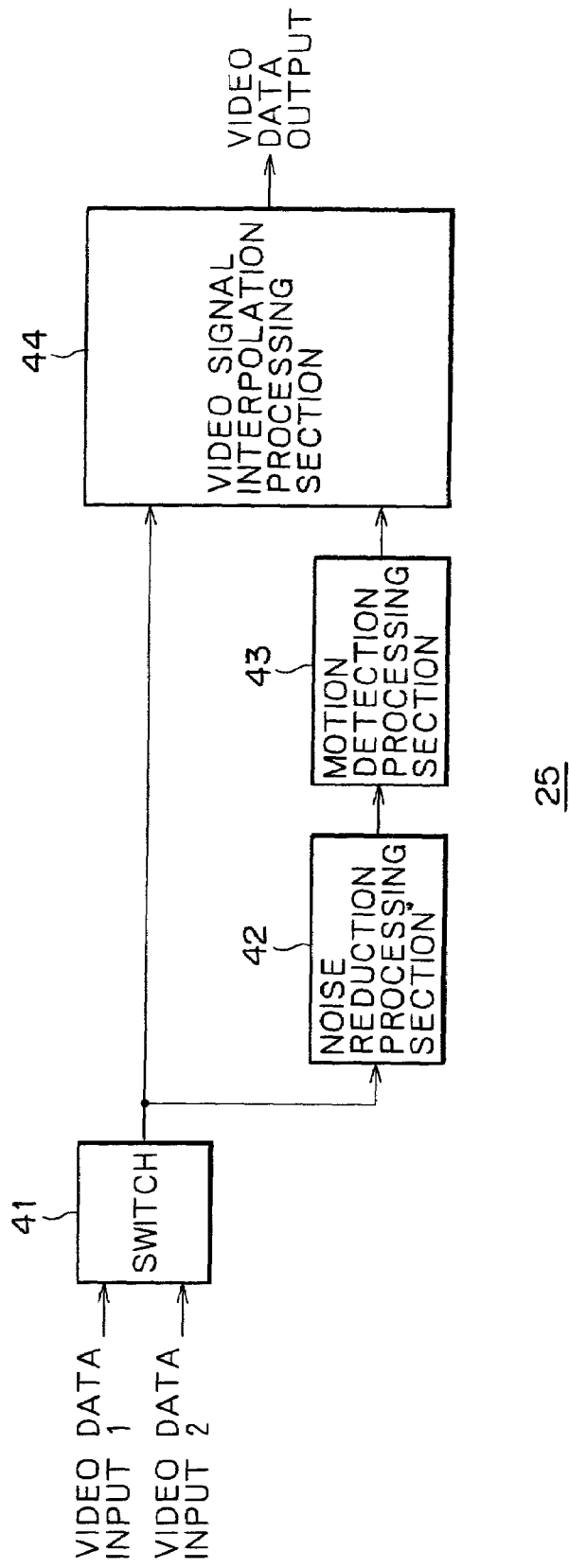
FIG. 3 is a block diagram showing an alternative construction of the video signal post-processing section shown in FIG. 1.

It is to be noted that, as an alternative, a noise reduction process may be performed only for a signal to be supplied to the motion detection processing section 43 from within the video data inputted from the switch 41 as seen from FIG. 3.

Figure 4:
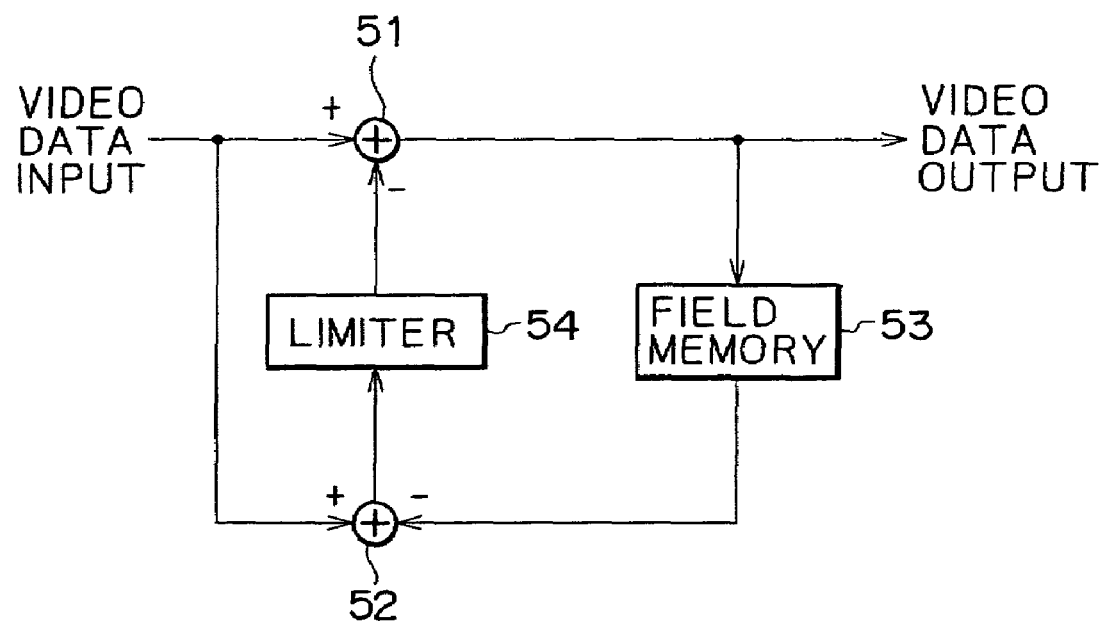
FIG. 4 is a block diagram showing a construction of a noise reduction processing section shown in FIG. 2.

Subsequently, details of the noise reduction processing circuit 42 are described with reference to FIG. 4. A subtractor 51 subtracts a noise component of a pixel supplied thereto from a limiter 54 from a pixel value of video data inputted thereto and outputs a resulting value as video data to the motion detection processing section 43 and the video signal interpolation processing section 44. Further, the subtractor 51 stores the resulting value into a field memory 53.

It is to be noted that a pixel value signifies a level of a brightness signal of a pixel.

Another subtractor 52 subtracts each pixel value of the preceding field (field prior by 16.667 ms in the NTSC system) stored in the field memory 53 from a corresponding one of pixel values of video data (a field) inputted thereto and outputs a result of the subtraction to the limiter 54.

The limiter 54 determines a value inputted thereto from the subtractor 52 as noise if the inputted value is equal to or higher than a predetermined threshold value, and outputs the value as noise of the corresponding pixel to the subtractor 51. However, if the value inputted from the subtractor 52 is lower than the predetermined threshold value, then the limiter 54 determines that the pixel value includes no noise, and outputs 0 as noise of the corresponding pixel to the subtractor 51.

Where each pixel value includes no noise, the pixel value exhibits no variation between fields if the pixel is of a still picture, but the pixel value exhibits a variation between fields if the pixel is of a moving picture. However, since such variations have some correlation, the pixel values do not exhibit a variation greater than the predetermined threshold value. In contrast, where each pixel includes some noise arising from MPEG compression or decompression, the variation of the pixel value between fields does not have a correlation, and therefore, in most cases, the variation is extremely great.

Thus, the limiter 54 calculates a difference of a pixel value of each pixel of video data inputted thereto from the subtractor 52 from a corresponding pixel value in the preceding field and determines the difference as noise if the difference in pixel value is equal to or higher than the predetermined threshold value. Thus, the limiter 54 outputs the difference to the subtractor 51 so that the difference is subtracted from the original pixel value by the subtractor 51 to remove the noise from the pixel data. Further, the pixel data from which the noise has been removed is outputted as an output of the noise reduction processing circuit 42 and further stored into the field memory 53. In other words, the subtractor 52 functions as a field cyclic noise reducer. It is to be noted that, while the noise reduction processing circuit 42 described above with reference to FIG. 4 is formed as a field cyclic noise reducer, it may otherwise be formed as a frame cyclic noise reducer or a cyclic noise reducer for a combination of fields and frames. Further, while the description above relates to a brightness signal, alternatively a chroma signal may be processed similarly.

Figure 5:
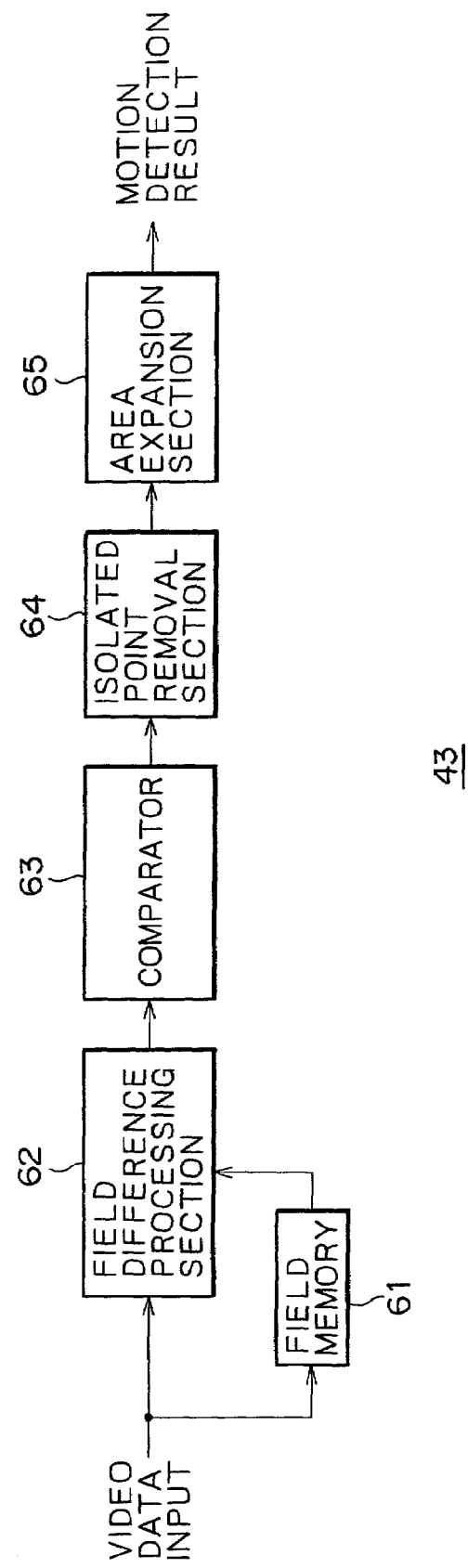
FIG. 5 is a block diagram showing a construction of a motion detection processing section shown in FIG. 2.

Now, the motion detection processing section 43 is described with reference to FIG. 5. A field memory 61 stores video data for one field and outputs pixel values delayed by one field period to a field difference processing section 62.

Figure 6:
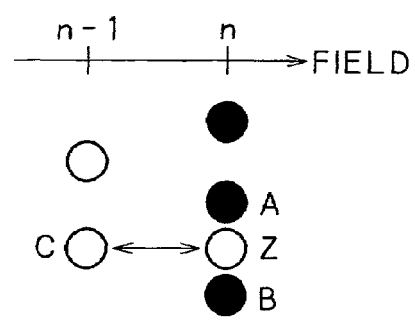
FIG. 6 is a diagrammatic view illustrating a field difference determination process.

The field difference processing section 62 calculates a difference between each pixel value of video data inputted directly thereto and a corresponding one of pixel values of video data of the preceding field supplied thereto from the field memory 61 and outputs the difference to a comparator 63. More particularly, upon determination of a difference between each pixel of video data of the nth field indicated by a dark circle and a corresponding one of pixels of video data of the preceding field (n−1th field), it calculates the difference after it corrects a displacement in spatial position between fields. In particular, a pixel Z on the nth field in FIG. 6 which corresponds to a pixel C of the n−1th field and does not originally exist is calculated from pixel values A and B which actually exist above and below the pixel Z, and a difference between the pixel Z and the pixel C is calculated. In short, the field difference processing section 62 determines a value F given by the following expression (1) as field difference data of each pixel and outputs the value F to the comparator 63:

$$F=|(A+B)/2-C| \tag{1}$$

where A, B and C represent pixel values (levels of the brightness signal) of the pixels of the video data illustrated in FIG. 6.

The comparator 63 compares the field difference value inputted thereto from the field difference processing section 62 with a predetermined threshold value. If the field difference value is equal to or higher than the threshold value, then the comparator 63 determines the pixel as a moving pixel, but if the field difference value is lower than the threshold value, then the comparator 63 determines the pixel as a still pixel. The field difference processing section 62 determines motion for each pixel and outputs such motion to an isolated point removal section 64.

The isolated point removal section 64 extracts, from those pixels which are discriminated as moving pixels based on the result of the comparison (motion) inputted thereto, any pixel (isolated point moving pixel) on the (horizontally) left and right sides of which still pictures are positioned and converts the extracted pixel from a moving pixel into a still pixel. In particular, since the pixels have a nature that each of them has a high correlation to the adjacent pixels on the left and right sides thereof, if still pictures are present on the opposite left and right sides of a pixel discriminated as a moving pixel, then the possibility that the pixel which should originally be a still pixel may be extracted as a moving pixel in error is high. Therefore, by removing an isolated point moving pixel in this manner, erroneous detection of a moving picture is suppressed.

An area expansion section 65 performs a process of converting, for example, two still pixels positioned horizontally adjacent each of the opposite sides of that portion of the pixels of the video data after removal of isolated point moving pixels which is formed from moving pixels thereby to expand the area of moving pixels. Since the possibility that a pixel discriminated as a moving pixel may be surrounded by moving pixels is high, the area of moving pixels is expanded. It is to be noted that, while two still pixels on each of the left and right sides of the area of moving pixels are converted into moving pixels by the moving pixel area expansion process described above, the number of such pixels may be decreased to 1 or may be increased to 3 or more.

Further, while the motion detection process described above uses a field difference, for example, another motion detection process which uses both of a frame difference and a field difference as proposed in Japanese Patent Application No. 15379/1999 filed for patent in Japan by the same assignee or a further motion detection process which uses only a frame difference as disclosed in the Japanese patent application specified above may be used alternatively.

Figure 7:
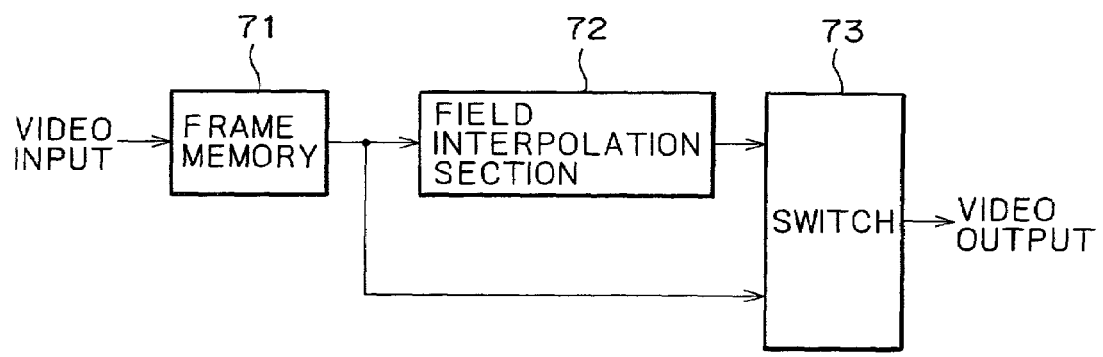
FIG. 7 is a block diagram showing a construction of a video signal interpolation processing section shown in FIG. 2.

Subsequently, details of the video signal interpolation processing section 44 are described with reference to FIG. 7. A frame memory 71 stores input video data in a unit of a frame. In particular, the frame memory 71 stores inputted video data for 2 fields once and outputs the video data for one frame to a field interpolation section 72 and a switch 73.

The field interpolation section 72 determines a pixel of a field to be determined as an average value of pixels above and below the pixel. In particular, the field interpolation section 72 determines the pixel value $Z(=(A+B)/2)$ of FIG. 6 over an entire field by arithmetic operation and outputs the thus determined pixel value to the switch 73.

The switch 73 selects, when a result of motion detection of a certain field is inputted thereto from the motion detection processing section 43, one of a pixel value inputted thereto from the field interpolation section 72 and a pixel value inputted directly thereto from the frame memory 71 based on the result of motion detection. In particular, when the motion detection result indicates that the pixel is a moving pixel, then the switch 73 selects, as a corresponding pixel value, a pixel value obtained by an interpolation process by the field interpolation section 72. However, when the motion detection result indicates that the pixel is a still pixel, the switch 73 selects a pixel value of the field inputted directly thereto from the frame memory 71. After video data for one field of pixel values are produced through the process described above, the switch 73 outputs the video data to the OSD circuit 26.

Figure 8:
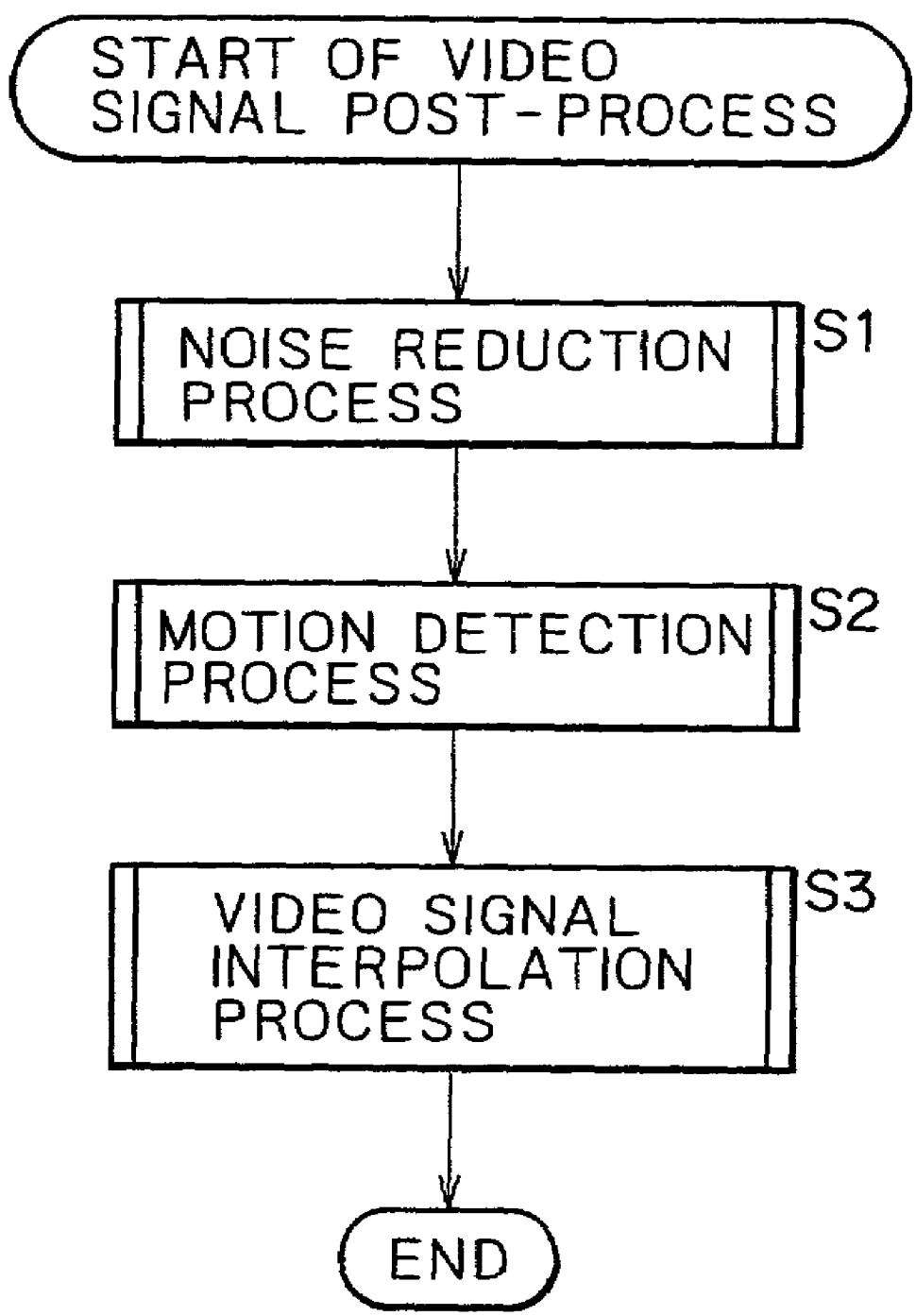
FIG. 8 is a flow chart illustrating a video signal post-process.

Now, a video signal post-process of the video signal post-processing section 25 is described with reference to a flow chart of FIG. 8. It is to be noted that, although the video signal post-processing section 25 of the construction described hereinabove with reference to FIG. 2 is referred to, the video signal post-processing section 25 of the construction described hereinabove with reference to FIG. 3 may be used instead.

When the switch 41 is switched in accordance with an instruction of the system controller 31 and video data is inputted from one of the MPEG AV decoder 24 and the video signal pre-processing section 17, the process is started, and in step S1, the noise reduction processing circuit 42 executes a noise reduction process.

Figure 9:
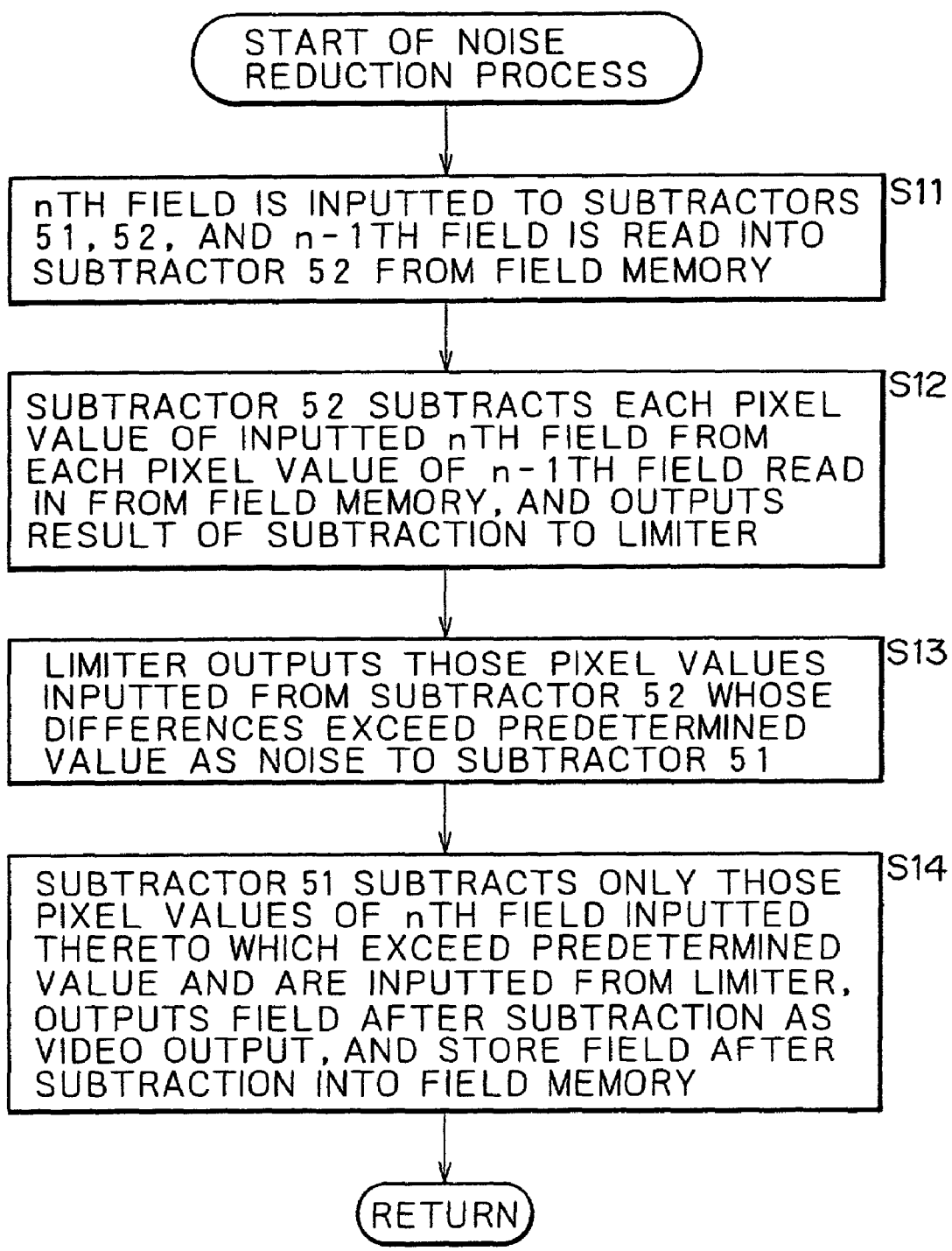
FIG. 9 is a flow chart illustrating a noise reduction process.
Figure 10:
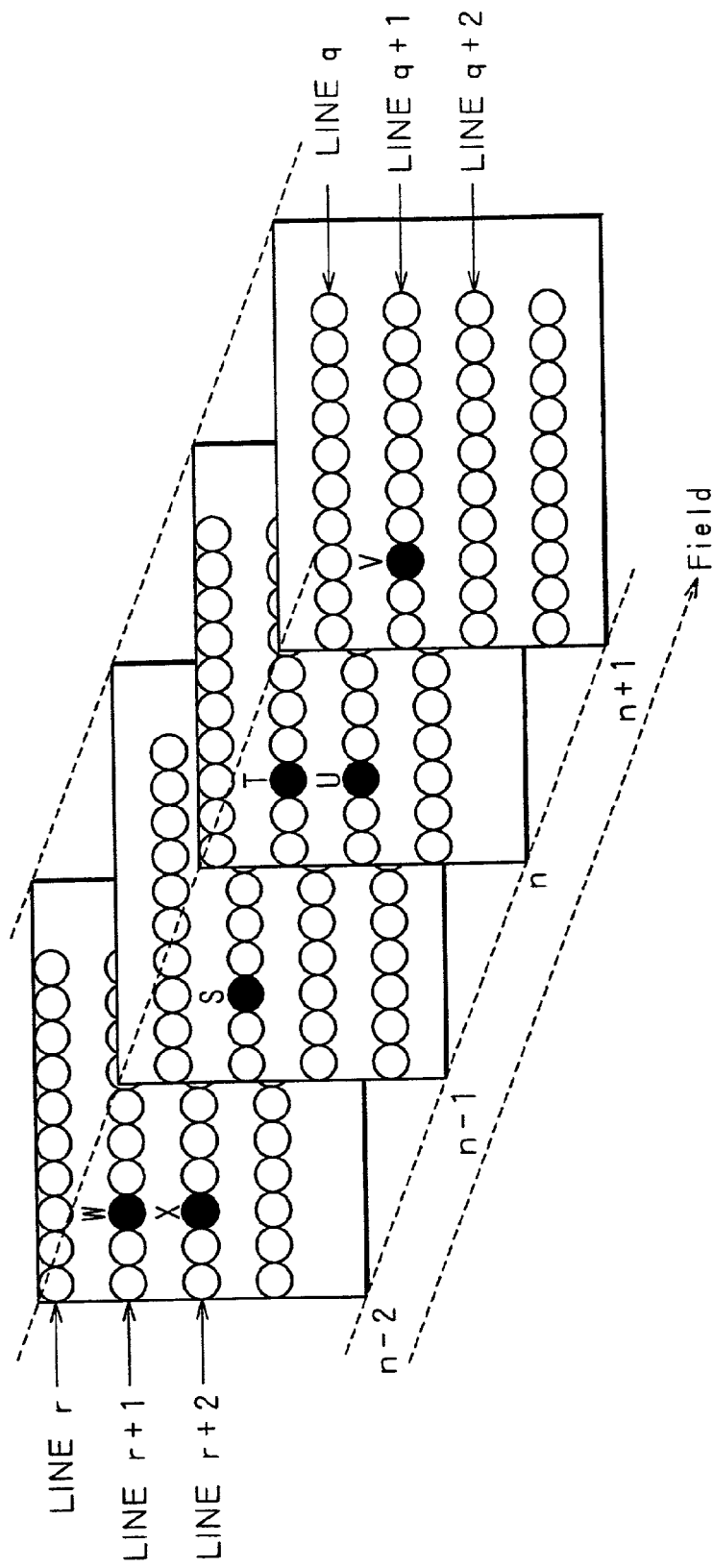
FIG. 10 is a diagrammatic view illustrating a positional relationship of field data.

Here, the noise reduction process is described with reference to a flow chart of FIG. 9. When video data is inputted to the noise reduction processing circuit 42, the process is started, and in step S11, for example, an nth field illustrated in FIG. 10 is inputted to the subtractors 51 and 52 and simultaneously an n−1th field (preceding field) is read from the field memory 53 into the subtractor 52.

In step S12, the subtractor 52 subtracts each pixel value of the n−1th field read in from the field memory 53 from a corresponding pixel value of the nth field inputted thereto and outputs a result of the subtraction to the limiter 54. In particular, in FIG. 10, a pixel value of a pixel S on a line q+1 of the n−1th field is subtracted from a pixel value of a corresponding pixel T on a line r+1 of the nth field (=T−S). The field memory 53 executes such arithmetic operation processing for each of the pixels and outputs a result of the arithmetic operation processing to the limiter 54.

In step S13, the limiter 54 compares the result of arithmetic operation inputted thereto from the subtractor 52 with a predetermined threshold value P set in advance as a range of motion. If the result of arithmetic operation is equal to or higher than the predetermined threshold value P, then the limiter 54 outputs a value (=T−S) obtained by subtraction of the predetermined value from the result of arithmetic operation inputted thereto from the subtractor 52 as noise to the subtractor 51. On the other hand, when the arithmetic operation result is lower than the predetermined threshold value P, the limiter 54 discriminates that the pixel includes no noise, and thus changes the arithmetic operation result to 0 and outputs it to the subtractor 51.

In step S14, the subtractor 51 subtracts, from each of the pixel values of the nth field inputted thereto, a corresponding noise component inputted thereto from the limiter 54 to reduce the noise and outputs a resulting value as video data. Further, the subtractor 51 records the resulting value into the field memory 53.

The noise reduction process in step S1 (FIG. 8) is executed in this manner.

Referring back to FIG. 8, the motion detection processing section 43 executes a motion detection process in step S2.

Figure 11:
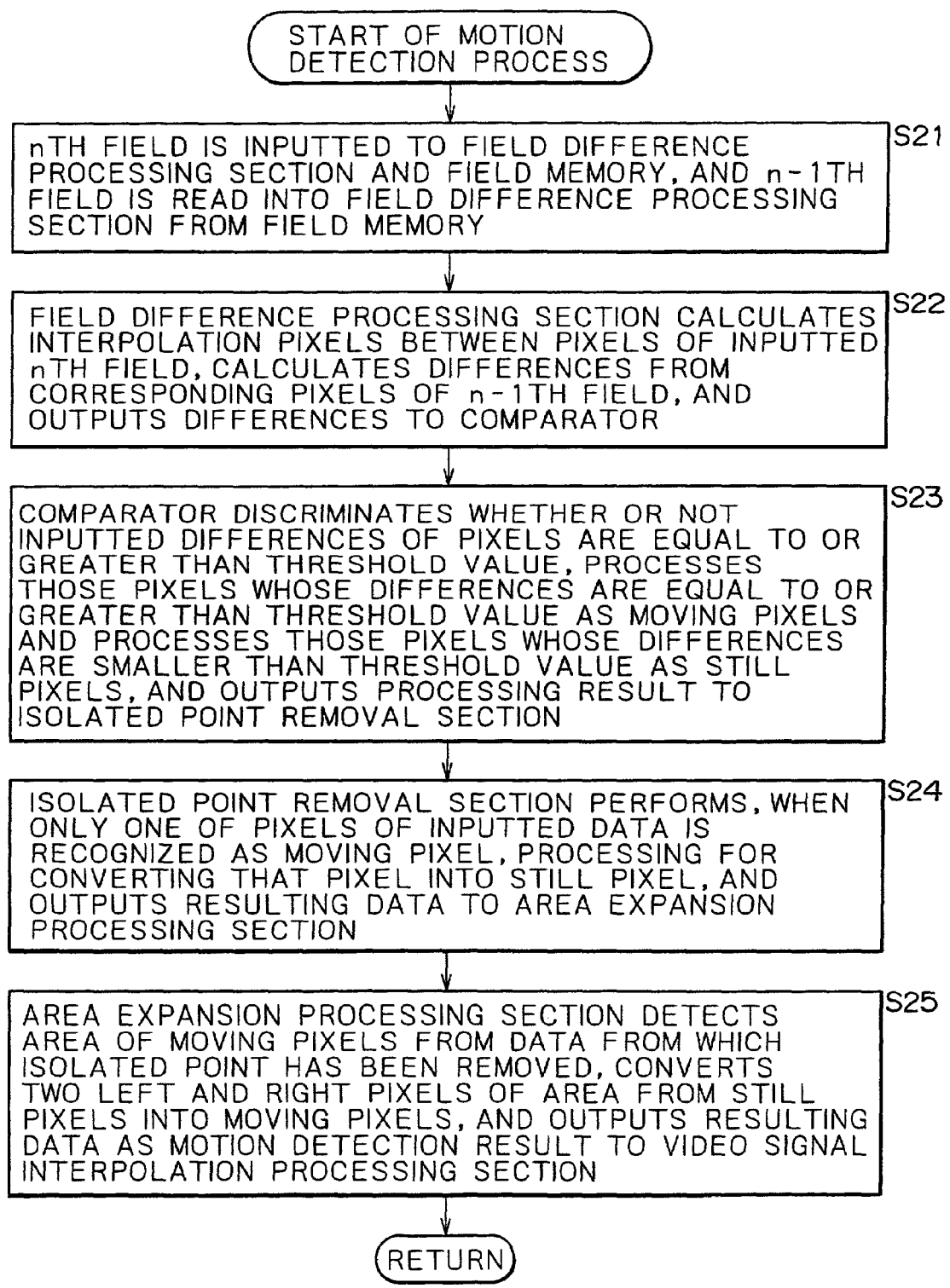
FIG. 11 is a flow chart illustrating a motion detection process.

Here, the motion detection process of the motion detection processing section 43 is described with reference to a flow chart of FIG. 11. For example, if the nth field of FIG. 10 is inputted to the motion detection processing section 43, then in step S21, the nth field is inputted to the field memory 61 and the field difference processing section 62, and simultaneously, the n−1th field is read from the field memory 61 into the field difference processing section 62.

In step S22, the field difference processing section 62 calculates a difference between each pixel value of the nth field and a corresponding pixel value of the n−1th field inputted thereto and outputs the difference to the comparator 63. In particular, since the nth field and the n−1th field exhibit a displacement in spatial position as shown in FIG. 10, and therefore, the difference is calculated after the displacement in spatial position is cancelled. FIG. 12 illustrates a spatial positional relationship with regard to the pixels in the third column from the left from among the field data of FIG. 10. The pixels of the fields are arranged in every other row in the vertical direction, and the pixels of the preceding and following fields are arranged alternately in the vertical direction. Therefore, the pixel which corresponds to the pixel S on the n−1th field is not originally present on the nth field as seen in FIG. 12. Therefore, as seen in FIG. 13, a pixel G which corresponds to the pixel S is produced as an average value of the pixels T and U (=(T+U)/2=G), and the difference between the pixels S and G (=|G−S|=|(T+U)/2−S|) is determined for each pixel and outputted to the comparator 63.

In step S23, the comparator 63 discriminates whether or not the difference result for each pixel is equal to or higher than a threshold value. If the difference is equal to or higher than the threshold value, then the comparator 63 discriminates that the pixel corresponding to the pixel S of the n−1th field is a moving pixel, and adopts an average value of the pixels T and U (=(T+U)/2=G) as the pixel value of the pixel. However, if the difference is lower than the threshold value, then the comparator 63 discriminates that the pixel is a still picture, and adopts the pixel value S as it is as the pixel value of the pixel. This processing is executed for each of the pixels of the entire n−1th field, and a result of the processing is outputted to the isolated point removal section 64.

Figure 14A:
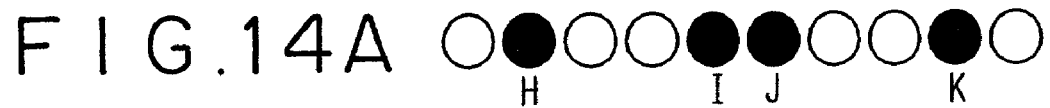
FIGS. 14A and 14B are diagrammatic views illustrating an isolated point removal process.
Figure 14B:

In step S24, the isolated point removal section 64 detects, from within the field inputted thereto, a moving pixel on the opposite horizontally left and right sides of which still pixels are positioned, and converts the moving pixel into a still pixel. The isolated point removal section 64 executes this processing for the entire field and outputs a result of the processing to the area expansion section 65. In particular, for example, where still pixels each represented by a blank circle and moving pixels each represented by a solid dark circle are arranged in such a manner as seen in FIG. 14A, the moving pixels H and K on the opposite left and right sides of which still pixels are positioned are converted into still pixels. However, the two moving pixels I and J on the opposite left and right sides of which still pixels are not positioned are processed as they are as moving pixels. Consequently, the pixels shown in FIG. 14A are changed to pixels of such an arrangement as seen in FIG. 14B.

Figure 15A:
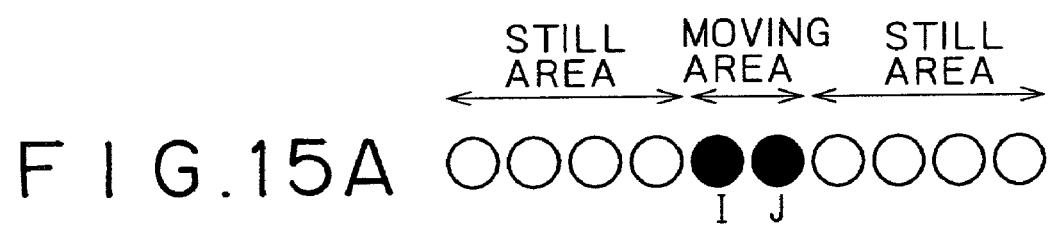
FIGS. 15A and 15B are diagrammatic views illustrating an area expansion process.
Figure 15B:
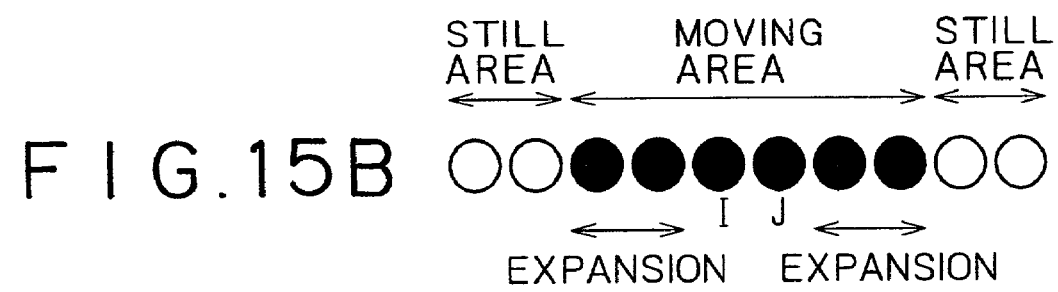

In step S25, the area expansion section 65 detects a moving pixel area composed of moving pixels in a horizontal direction, converts those two of still pixels in each of a pair of still pixel areas arranged on the opposite left and right sides of the moving pixel area and composed of still pixels which are adjacent the moving pixel area into moving pixels thereby to expand the moving pixel area and outputs resulting data to the video signal interpolation processing section 44. In particular, pixels inputted as seen in FIG. 15A (similar as in FIG. 14B) are processed such that two of still pictures arranged on each of the left and right sides of the moving pixel area (pixels I and J) are converted into moving pixels as seen in FIG. 15B thereby to expand the moving pixel area. Then, resulting data obtained by such expansion of the moving pixel area are outputted to the video signal interpolation processing section 44.

In step S2 (FIG. 8), the motion detection processing section 43 executes the motion detection process of the video data inputted thereto in such a manner as described above and outputs a result of the motion detection to the video signal interpolation processing section 44.

Referring back to FIG. 8, the video signal interpolation processing section 44 performs, in step S3, a video signal interpolation process for the video data inputted thereto. Here, the video signal interpolation process of the video signal interpolation processing section 44 is described with reference to a flow chart of FIG. 16.

In step S31, the nth field is inputted as video data to and stored into the frame memory 71. Further, a motion detection result of the n−1th field is inputted from the motion detection processing section 43 to the switch 73.

In step S32, the frame memory 71 outputs a frame composed of the nth field and the n−1th field to the field interpolation section 72 and the switch 73.

In step S33, the field interpolation section 72 produces, between each pixel of the nth field of the frame inputted thereto and another pixel adjacent the pixel in a vertical direction, an interpolation pixel having an average value of the pixel values of the pixels and outputs the interpolation pixel to the switch 73. In particular, the interpolation process is a process of producing a pixel G through an interpolation process of determining an average value of pixels T and U as seen in FIG. 13 over the entire area of the nth field.

In step S34, the switch 73 produces a field using the pixel values obtained by the interpolation process of the field interpolation section 72 for those pixels of the n−1th field inputted as moving pixels and using those pixels inputted directly from the frame memory 71 as they are for those pixels inputted as still pixels based on the result of the motion detection. The switch 73 outputs the field as an interlaced image to the OSD circuit 26.

In step S3, the video signal interpolation processing section 44 executes the video signal interpolation process in such a manner as described above.

With the video recording and playback apparatus 1 described above, when a video is to be displayed, a noise reduction process is executed prior to a motion detection process so that an error in motion detection caused by noise included in video data or noise generated upon MPEG compression and/or decompression is suppressed. Consequently, the motion detection can be executed accurately.

While the series of processes described above can be executed by hardware, it may otherwise be executed by software. Where the series of processes is executed by software, a program which constructs the software is installed from a recording medium into a computer incorporated in hardware for exclusive use or, for example, a personal computer for universal use which can execute various functions by installing various programs.

The recording medium may be formed not only as the hard disk drive 23 which has the program recorded thereon and is provided to a user in such a form that it is incorporated in advance in the video recording and playback apparatus 1 as shown in FIG. 1, but also as a package medium such as a magnetic disk 121 (including a floppy disk), an optical disk 122 (including a CD-ROM (Compact Disk-Read Only Memory) and a DVD (Digital Versatile Disk)), a magneto-optical disk 123 (including an MD (Mini-Disk)), or a semiconductor memory 124 which has the program recorded thereon or therein and is distributed separately from a computer in order to provide the program to a user.

It is to be noted that, in the present specification, the steps which describe the program recorded in or on a recording medium may be but need not necessarily be processed in a time series in the order as described, and include processes which are executed parallelly or individually without being processed in a time series.

While a preferred embodiment of the present invention has been described using specific terms, such description is for illustrative purposes only, and it is to be understood that changes and variations may be made without departing from the spirit or scope of the following claims.

What is claimed is:

1. A video recording and/or playback apparatus for recording a video supplied thereto or playing back a video recorded already, comprising:
    noise reduction means for reducing noise of a video supplied to said video recording and/or playback apparatus or noise of a video recorded already by said video recording and/or playback apparatus;
    motion detection means for executing motion detection of the video whose noise has been reduced by said noise reduction means; and
    video signal interpolation processing means for performing an interpolation process for the video supplied or the video recorded already based on a result of the motion detection by said motion detection means, the interpolation process determining a value of a first pixel based on a value of at least a second pixel arranged above or below the first pixel.

2. A video recording and/or playback method for a video recording and/or playback apparatus for recording a video supplied thereto or playing back a video recorded already, comprising:
    a noise reduction step of reducing noise of a video supplied to said video recording and/or playback apparatus or of a video recorded already by said video recording and/or playback apparatus using a cyclic noise reducer which uses either one or both of a field and a frame of the video;
    a motion detection step of executing motion detection of the video whose noise has been reduced by the processing in the noise reduction step; and
    a video signal interpolation processing step of performing an interpolation process for the video supplied or the video recorded already based on a result of the motion detection by the processing in the motion detection step, the interpolation process determining a value of a first pixel based on a value of at least a second pixel arranged above or below the first pixel.

3. A video recording and/or playback apparatus for recording a video supplied thereto or playing back a video recorded already, comprising:
    a noise reduction unit configured to reduce noise of a video supplied to said video recording and/or playback apparatus or noise of a video recorded already by said video recording and/or playback apparatus;
    a motion detection unit configured to execute motion detection of the video whose noise has been reduced by said noise reduction unit; and
    a video signal interpolation processing unit configured to perform an interpolation process for the video supplied or the video recorded already based on a result of the motion detection by said motion detection unit, the interpolation process determining a value of a first pixel based on a value of at least a second pixel arranged above or below the first pixel.

4. A video recording and/or playback method for a video recording and/or playback apparatus for recording a video supplied thereto or playing back a video recorded already, comprising:
    a noise reduction step for reducing noise of a video supplied to said video recording and/or playback apparatus or of a video recorded already by said video recording and/or playback apparatus using a cyclic noise reducer which uses either one or both of a field and a frame of the video;
    a motion detection step for executing motion detection of the video whose noise has been reduced by the processing in the noise reduction step; and
    a video signal interpolation processing step for performing an interpolation process for the video supplied or the video recorded already based on a result of the motion detection by the processing in the motion detection step, the interpolation process determining a value of a first pixel based on a value of at least a second pixel arranged above or below the first pixel.

* * * * *